United States Patent [19]

Wright et al.

[11] 4,015,737
[45] Apr. 5, 1977

[54] BALE MOVER

[75] Inventors: Harold G. Wright, Scranton;
Richard J. Gordon, Grand Junction, both of Iowa

[73] Assignee: Scranton Manufacturing Company, Inc., Scranton, Iowa

[22] Filed: May 19, 1975

[21] Appl. No.: 578,534

[52] U.S. Cl. .............................. 214/501; 214/146.5; 214/505; 254/3 R
[51] Int. Cl.² ......................................... B60P 1/16
[58] Field of Search .............. 214/501, 505, 146.5, 214/6 B; 254/3 R, 3 B, 3 C

[56] References Cited

UNITED STATES PATENTS

| | | | |
|---|---|---|---|
| 1,514,769 | 11/1924 | Johnston et al. | 214/146.5 |
| 1,604,494 | 10/1926 | Snyder | 214/146.5 |
| 2,354,337 | 7/1944 | Smith | 214/505 |
| 2,708,047 | 5/1955 | Seidle | 214/146.5 |
| 3,896,956 | 7/1975 | Hostetler | 214/501 |

*Primary Examiner*—Trygve M. Blix
*Assistant Examiner*—Charles E. Frankfort
*Attorney, Agent, or Firm*—Henderson, Strom & Sturm

[57] ABSTRACT

An object loading and unloading apparatus of a type having a framework adapted to be connected to a truck bed. A track is connected to the framework and has a plurality of rollers located thereon. A frame having forklift members connected perpendicularly to the bottom thereof is movably mounted on the track so that in one position the forklift members can be driven under an object to be transported. A winch is connected to the framework and has a cable which connects to a pulley on top of the frame for selectively pivoting the frame and forklift members and for pulling such frame and thereby an object to be loaded onto the track and thereby onto a truckbed. The winch is further utilized for unloading by releasing the frame and allowing it to slide down the track by gravity and then to pivot, also by the force of gravity, into an unloading position.

1 Claim, 8 Drawing Figures

BALE MOVER

BACKGROUND OF THE INVENTION

The present invention relates generally to an object loading and unloading device for a truck, and more particularly to a forklift-type of loading and unloading device which is winch operated.

In the recent past and even somewhat today, the common manner of handling hay is to bale it into small bales which are light enough to be manually loaded or unloaded. However, one of the most increasingly popular methods of handling hay is to use a baler which produces large round bales of hay weighing from 1,000 to 3,000, pounds, for example. Since these bales are obviously too heavy to be handled by hand, there has developed a real need for equipment to transport such large bales.

Forklift devices have been devised for attachment to the hydraulic hitches of agricultural tractors and these devices have proven to be quite satisfactory for transporting bales for short distances. When it is desired to transport such bales over longer distances, tractors are not very practical because they do not travel at normal highway speeds. Consequently, these large bales must be lifted by a forklift device attached to a tractor or other machine onto a truck and transported to the final destination where it must then be unloaded, usually by utilizing similar forklift equipment.

Because of the above mentioned circumstances, it would be desirable to have equipment on the truck itself which is capable of loading and unloadng such large objects as the aforementioned large bales of hay. This is true whether long or short distance transportation is contemplated.

SUMMARY OF THE INVENTION

The present invention relates to a device which is adapted to be connected to a truck for loading and unloading objects to and from the truck. A track is connected to the framework of such device. A frame having forklift members perpendicularly connected to one end thereof is movably connected to the track for movement from one loading position, wherein the forklift members are parallel to and adjacent to the ground, to a second position whereby the frame and fork members and consequently anything loaded thereon is pivoted about the intermediate point on the frame by a winch and cable and then pulled up the track on rollers to a loaded position. The winch is also operable to release the frame, fork members and load so that these members can move by the force of gravity down to the bottom of the track, and at such point then pivot to the unloading position.

An object of the present invention is to provide a winch operated device for loading and unloading objects to and from a truck.

Another object of the invention is to provide a means for handling large bales of hay using a small truck.

Other objects, advantages, and novel features of the present invention will become apparent from the following detailed description of the invention when considered in conjunction with the accompanying drawings.

DESCRIPTION OF THE PREFERRED EMBODIMENT

Figure 1:
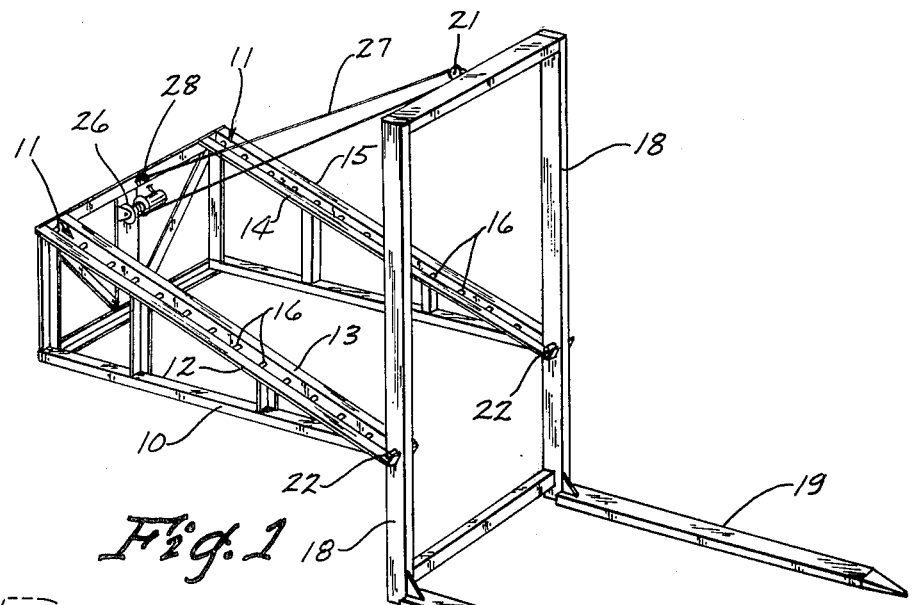
FIG. 1 is a perspective view of the present invention showing the present invention in a position to load or unload an object.
Figure 2:
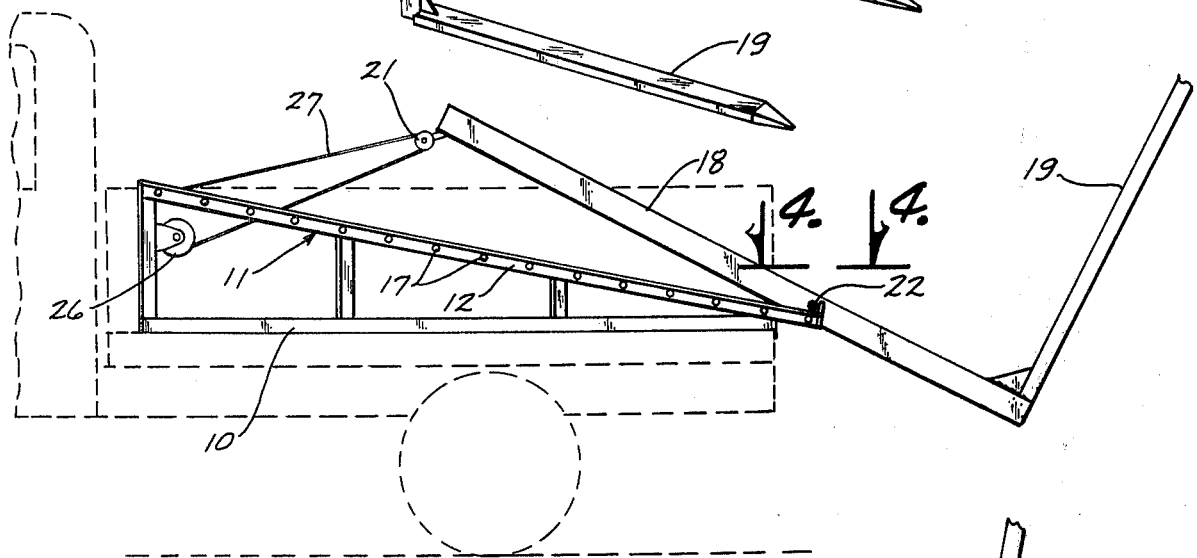
FIG. 2 is a side elevational view of the present invention showing the device in a half loaded or half unloaded position.
Figure 5:
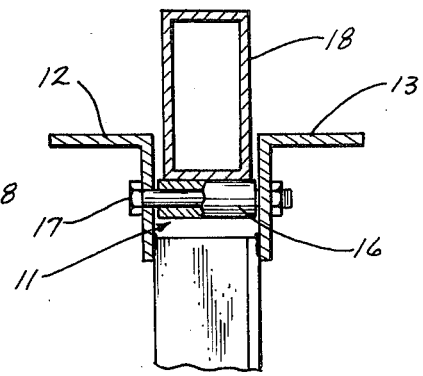
FIG. 5 is a cross sectional view taken along line 5—5 of FIG. 4.

Referring now to the drawings wherein like reference numerals designate identical or corresponding parts throughout the several views, FIG. 1 shows a framework 10 which has a pair of tracks 11 mounted thereto. Each of these tracks 11 has a pair of straight members 12, 13, 14 and 15 attached thereto. A plurality of rollers 16 are rotatably disposed between the track members by a nut and bolt device 17 (FIG. 5).

Figure 4:
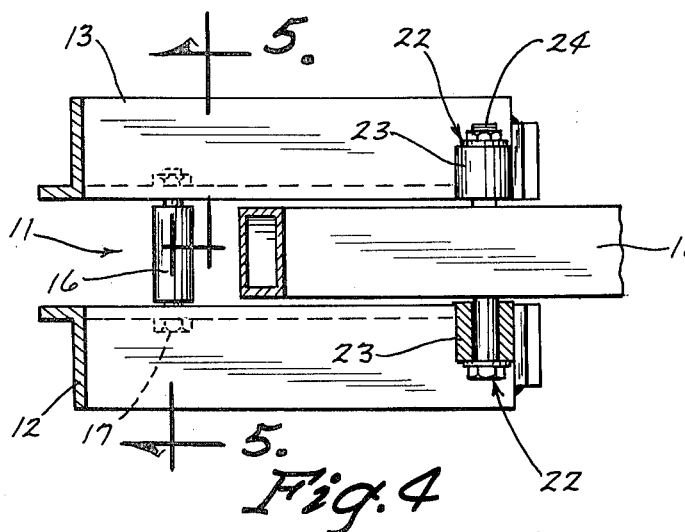
FIG. 4 is a cross-sectional view taken along line 4—4 of FIG. 2.

A frame 18 has a pair of forklift members 19 rigidly attached to the bottom thereof, and a pulley structure 21 is attached to the top thereof. Projections 22 extend from an intermediate portion of the frame 18, and these projections 22 may take the form of rollers 23 (FIG. 4) attached by nut and bolt devices 24. Such roller structure is desirable if the projection 22 is designed to contact the top of the frame members 12–15, but such projection can be non-rotatably fixed to the frame 18 if such projections 22 are designed to ride above the top surfaces of the ramp members 12–15 when the frame 18 is riding on the rollers 16.

A winch 26 is connected to the top forward portion of the framework 10 and this winch 26 reels a cable 27 inwardly or outwardly therefrom, as is well known. This cable 27 extends from the winch 26 around the pulley 21 on the top of the frame 18 and back to a solid connection 28 on the framework 10.

Figure 3:
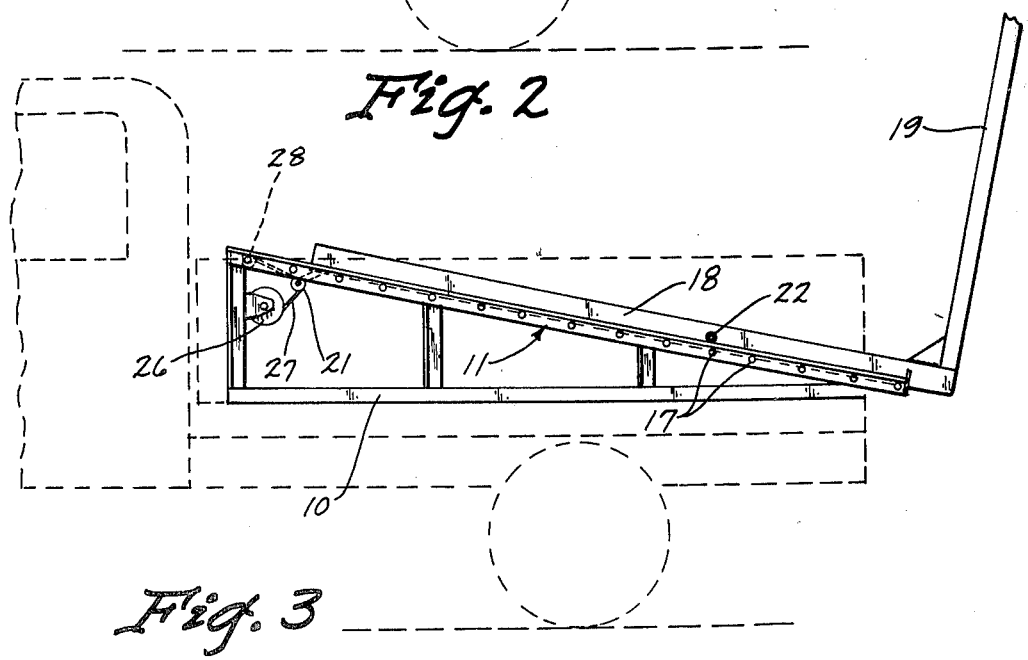
FIG. 3 is a side elevational view showing the present invention in a loaded position.
Figure 6:
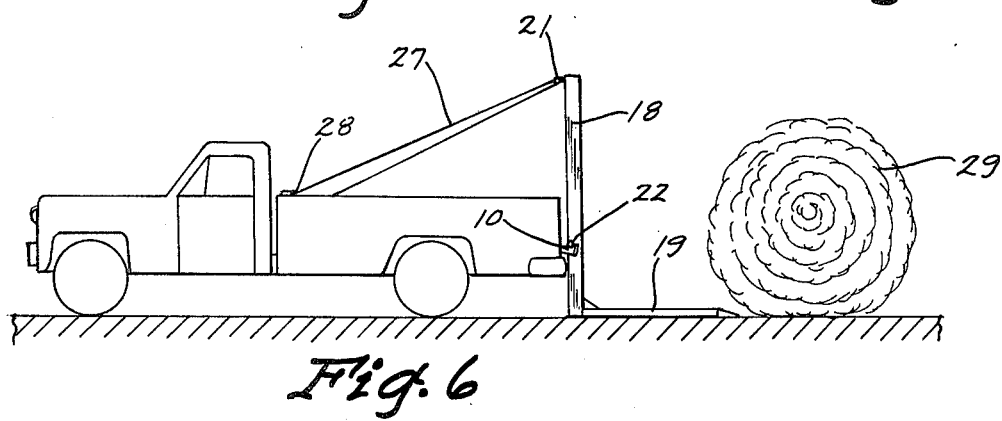
FIG. 6 is a side elevational view showing the present invention in a position in readiness to load a large bale of hay.
Figure 7:
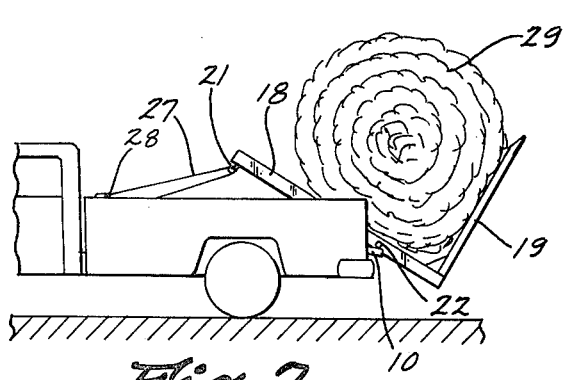
FIG. 7 is a side elevational view like FIG. 6 but showing the device having been driven under a bale of hay and partially loaded thereon.
Figure 8:
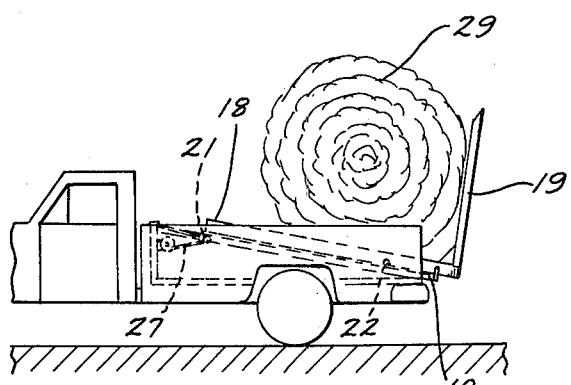
FIG. 8 is a side elevational view of the present invention showing the loaded position of a large bale of hay picked up by the present invention.

When it is desired to use the present invention, the winch 26 is operated by an actuator for an electric or hydraulic motor to unwind and loosen the cable 27 so that, by gravity, the frame 18 and forklift members 19 will roll down the ramps 11 from the position shown in FIG. 3 to the position shown in FIGS. 1 and 6. Once this has been done and the truck to which this device is attached is in the position with respect to an object to be loaded as shown in FIG. 6, then the truck is backed up such that the forklift members 19 pass under the bale 29 or other object, as desired. Once the forklift members 19 are fully under the object 29, then the winch 26 is utilized to reel up the cable 27 and thereby pull the bale onto the truck as shown in stages in FIGS. 7 and 8. It is to be understood that the winch 26 first pivots the frame 18 from the position shown in FIG. 6 to the position shown in FIG. 7 and after such pivoting has been accomplished, then the frame 18, forklifts 19 and the bale 29 or other object is pulled up the tracks 11 on the track rollers 16 by the further action of the winch 26, to the finally loaded position shown in FIG. 8.

Obviously, many modifications and variations of the present invention are possible in light of the above teachings. It is therefore to be understood that, within the scope of the appended claims, the invention may be practiced otherwise than as specifically described.

We claim:

1. Apparatus for loading and unloading objects comprising:

a framework rigidly connected to a vehicle;

track means rigidly connected to said framework, said track means having one end lower than the other end thereof, the lower end of said track means having stop means thereon, said track means including a first pair of spaced apart straight parallel track members having a plurality of rollers rotatably disposed therebetween and a second pair of spaced apart straight parallel track members having a plurality of rollers rotatably disposed therebetween;

a frame having two fork members connected thereto adjacent one end thereof, said fork members being disposed at an angle with respect to said frame, said frame being movably mounted on said track, said frame including two parallel straight frame members connected to said fork members and disposed at right angles with respect thereto, and means for connecting said two straight frame members together, said rollers being disposed below the top sides of the first and second pair of straight track members whereby said frame members extend between said track members and thereby guided by said straight track members;

projection means connected to said frame intermediate the ends thereof for contacting said stop means and thereby preventing the frame from moving off of the track means; and actuating means interconnecting a portion of the other end of said frame and a portion of said framework for controlling the movement of said frame with respect to said framework, said actuating means including a winch connected to said framework and a cable connected to said winch at one end and to said framework at the other end thereof, a pulley connected to said frame and said cable being disposed around one side of said pulley.

* * * * *